United States Patent
Lisch et al.

(10) Patent No.: US 9,221,223 B2
(45) Date of Patent: Dec. 29, 2015

(54) APPARATUS AND METHOD FOR CONTROLLING TEMPERATURE GRADIENT THROUGH WALL THICKNESS OF CONTAINER

(71) Applicant: Amcor Limited, Hawthorn (AU)

(72) Inventors: G. David Lisch, Jackson, MI (US); Bradley Wilson, Manchester, MI (US); Kirk E. Maki, Tecumseh, MI (US); Theodore F. Eberle, Ann Arbor, MI (US); Luke A. Mast, Brooklyn, MI (US)

(73) Assignee: Discma AG, Hünenberg (CH)

( * ) Notice: Subject to any disclaimer, the term of this patent is extended or adjusted under 35 U.S.C. 154(b) by 233 days.

(21) Appl. No.: 13/721,361

(22) Filed: Dec. 20, 2012

(65) Prior Publication Data

US 2013/0161877 A1    Jun. 27, 2013

Related U.S. Application Data (60) Provisional application No. 61/579,150, filed on Dec. 22, 2011.

(51) Int. Cl.
*B29D 22/00* (2006.01)
*B29C 49/46* (2006.01)
(Continued)

(52) U.S. Cl.
CPC .............. *B29D 22/003* (2013.01); *B29C 49/46* (2013.01); *B29C 49/786* (2013.01); *B29C 49/06* (2013.01); *B29C 49/6454* (2013.01); *B29C 2049/4664* (2013.01)

(58) Field of Classification Search
None
See application file for complete search history.

(56) References Cited

U.S. PATENT DOCUMENTS 2,642,627 A    6/1953  Mann et al.
3,267,185 A    8/1966  Freeman, Jr.
(Continued)

FOREIGN PATENT DOCUMENTS

EP    0089201 A2    9/1983
EP    0379264       7/1990
(Continued)

OTHER PUBLICATIONS

International Search Report and Written Opinion dated Apr. 25, 2013 in corresponding International Patent Application No. PCT/US2012/070928 (nine pages).

*Primary Examiner* — Monica Huson
(74) *Attorney, Agent, or Firm* — Honigman Miller Schwartz and Cohn LLP; Eric J. Sosenko; Jonathan P. O'Brien (57) ABSTRACT

A method of forming a container includes providing a preform of the container. The preform has a wall with an interior region and an exterior region. The method also includes disposing the preform in a mold cavity wherein the mold cavity has a mold surface. Furthermore, the method includes introducing a substance into the preform to expand the preform toward the mold surface. The interior region of the wall has a first interior temperature prior to the introduction of the substance and a second interior temperature after the introduction of the substance. The exterior region of the wall has a first exterior temperature prior to the introduction of the substance and a second exterior temperature after the introduction of the substance. The method further includes controlling the first interior temperature to be greater than the first exterior temperature prior to the introduction of the substance.

42 Claims, 5 Drawing Sheets

(51) Int. Cl.
*B29C 49/78* (2006.01)
*B29C 49/06* (2006.01)
*B29C 49/64* (2006.01)

(56) References Cited

U.S. PATENT DOCUMENTS

| | | | |
|---|---|---|---|
| 3,268,635 | A | 8/1966 | Kraus et al. |
| 3,993,427 | A | 11/1976 | Kauffman et al. |
| 4,039,641 | A | 8/1977 | Collins |
| 4,127,633 | A * | 11/1978 | Addleman ............ 264/510 |
| 4,177,239 | A | 12/1979 | Gittner et al. |
| 4,321,938 | A | 3/1982 | Siller |
| 4,407,651 | A * | 10/1983 | Beck et al. ............ 432/11 |
| 4,432,720 | A | 2/1984 | Wiatt et al. |
| 4,457,688 | A | 7/1984 | Calvert et al. |
| 4,490,327 | A | 12/1984 | Calvert et al. |
| 4,499,045 | A | 2/1985 | Obsomer |
| 4,539,172 | A | 9/1985 | Winchell et al. |
| 4,571,173 | A | 2/1986 | Chang et al. |
| 4,725,464 | A | 2/1988 | Collette |
| 4,731,513 | A | 3/1988 | Collette |
| 4,883,631 | A | 11/1989 | Ajmera |
| 4,935,190 | A | 6/1990 | Tennerstedt |
| 4,952,134 | A | 8/1990 | Bartley et al. |
| 5,067,622 | A * | 11/1991 | Garver et al. ............ 215/381 |
| 5,129,815 | A | 7/1992 | Miyazawa et al. |
| 5,269,672 | A | 12/1993 | DiGangi, Jr. |
| 5,344,596 | A | 9/1994 | Hendry |
| 5,389,332 | A | 2/1995 | Amari et al. |
| 5,403,538 | A | 4/1995 | Maeda |
| 5,486,103 | A | 1/1996 | Meiring et al. |
| 5,540,879 | A | 7/1996 | Orimoto et al. |
| 5,599,496 | A | 2/1997 | Krishnakumar et al. |
| 5,622,735 | A | 4/1997 | Krishnakumar et al. |
| 5,635,226 | A | 6/1997 | Koda et al. |
| 5,687,550 | A | 11/1997 | Hansen et al. |
| 5,824,237 | A | 10/1998 | Stumpf et al. |
| 5,962,039 | A | 10/1999 | Katou et al. |
| 6,214,282 | B1 | 4/2001 | Katou et al. |
| 6,277,321 | B1 | 8/2001 | Vailliencourt et al. |
| 6,485,670 | B1 | 11/2002 | Boyd et al. |
| 6,502,369 | B1 | 1/2003 | Andison et al. |
| 6,692,684 | B1 | 2/2004 | Nantin et al. |
| 6,729,868 | B1 | 5/2004 | Vogel et al. |
| 6,749,415 | B2 | 6/2004 | Boyd et al. |
| 6,767,197 | B2 | 7/2004 | Boyd et al. |
| 7,141,190 | B2 | 11/2006 | Hekal |
| 7,473,388 | B2 | 1/2009 | Desanaux et al. |
| 7,491,358 | B2 | 2/2009 | Gernhuber et al. |
| 7,553,441 | B2 | 6/2009 | Shi |
| 7,658,882 | B2 | 2/2010 | Minganti |
| 7,862,327 | B2 | 1/2011 | Rousseau et al. |
| 7,914,726 | B2 | 3/2011 | Andison et al. |
| 7,981,356 | B2 | 7/2011 | Warner et al. |
| 8,017,064 | B2 | 9/2011 | Andison et al. |
| 8,096,483 | B2 | 1/2012 | Riney |
| 8,435,026 | B2 | 5/2013 | Andison et al. |
| 2001/0010145 | A1 | 8/2001 | Tawa et al. |
| 2004/0070119 | A1 | 4/2004 | Fibbia et al. |
| 2005/0067002 | A1 | 3/2005 | Jones |
| 2005/0098527 | A1 | 5/2005 | Yates, III |
| 2005/0206045 | A1 * | 9/2005 | Desanaux et al. ............ 264/535 |
| 2006/0097417 | A1 | 5/2006 | Emmer |
| 2006/0231646 | A1 | 10/2006 | Geary, Jr. |
| 2008/0271812 | A1 | 11/2008 | Stefanello et al. |
| 2010/0084493 | A1 | 4/2010 | Troudt |
| 2010/0213629 | A1 | 8/2010 | Adriansens |
| 2010/0303946 | A1 | 12/2010 | Voth |
| 2011/0031659 | A1 * | 2/2011 | Warner et al. ............ 264/528 |
| 2011/0265433 | A1 | 11/2011 | Chauvin et al. |

FOREIGN PATENT DOCUMENTS

| | | |
|---|---|---|
| EP | 0445465 | 11/1990 |
| EP | 0849514 | 6/1998 |
| EP | 1529620 | 5/2005 |
| EP | 1577258 | 9/2005 |
| EP | 1688234 | 8/2006 |
| FR | 2887525 | 12/2006 |
| JP | 57123027 | 7/1982 |
| JP | 63-249616 | 10/1988 |
| JP | 08-197563 | 8/1996 |
| JP | 09-011325 | 1/1997 |
| JP | 09057834 | 3/1997 |
| JP | 09099477 | 4/1997 |
| JP | 10-217258 | 8/1998 |
| JP | 2000-043129 | 2/2000 |
| JP | 2000-043130 | 2/2000 |
| JP | 2000-167915 | 6/2000 |
| JP | 2002-067131 | 3/2002 |
| JP | 2003-053823 | 2/2003 |
| JP | 2005-067002 | 3/2005 |
| JP | 2005-254704 | 9/2005 |
| JP | 2009-045876 | 3/2009 |
| JP | 2005-529002 | 9/2009 |
| KR | 10-0147442 | 8/1998 |
| KR | 2006-0105883 | 10/2006 |
| KR | 2006-0128062 | 12/2006 |
| WO | WO 02/24435 | 3/2002 |
| WO | WO 03/095179 | 11/2003 |
| WO | WO 2004/065105 | 8/2004 |
| WO | WO 2005/044540 | 5/2005 |
| WO | WO 2007/120807 | 10/2007 |
| WO | WO 2008/129013 | 10/2008 |

* cited by examiner

APPARATUS AND METHOD FOR CONTROLLING TEMPERATURE GRADIENT THROUGH WALL THICKNESS OF CONTAINER

CROSS-REFERENCE TO RELATED APPLICATIONS

This application claims the benefit of U.S. Provisional Application No. 61/579,150, filed on Dec. 22, 2011. The entire disclosure of the above application is incorporated herein by reference.

FIELD

The present disclosure relates to a container and, more particularly, relates to an apparatus and method for controlling the temperature gradient through the wall thickness of a container.

BACKGROUND

This section provides background information related to the present disclosure which is not necessarily prior art.

As a result of environmental and other concerns, plastic containers (more specifically polyester and even more specifically polyethylene terephthalate (PET) containers) are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left( \frac{\rho - \rho_a}{\rho_c - \rho_a} \right) \times 100$$

where $\rho$ is the density of the PET material, $\rho_a$ is the density of pure amorphous PET material (1.333 g/cc), and $\rho_c$ is the density of pure crystalline material (1.455 g/cc). Once a container has been blown, a commodity may be filled into the container. Also, in some cases, a preform of the container is formed (e.g., by injection molding), and the commodity is introduced into the preform to expand the preform and simultaneously form and fill the container.

SUMMARY

This section provides a general summary of the disclosure, and is not a comprehensive disclosure of its full scope or all of its features.

A method of forming a container is disclosed. The method includes providing a preform of the container. The preform has a wall with an interior region and an exterior region. The method also includes disposing the preform in a mold cavity wherein the mold cavity has a mold surface. Furthermore, the method includes introducing a substance into the preform to expand the preform toward the mold surface. The interior region of the wall has a first interior temperature prior to the introduction of the substance and a second interior temperature after the introduction of the substance. The exterior region of the wall has a first exterior temperature prior to the introduction of the substance and a second exterior temperature after the introduction of the substance. The method further includes controlling the first interior temperature to be greater than the first exterior temperature prior to the introduction of the substance.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
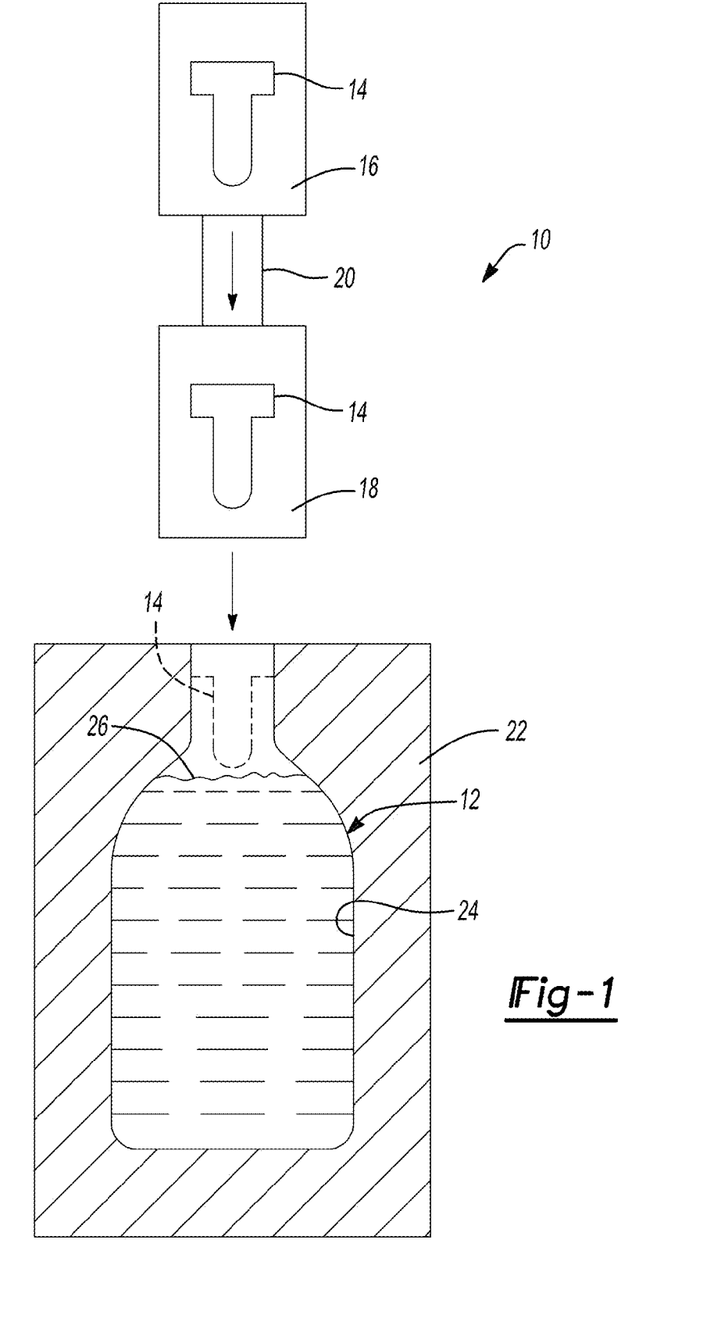
FIG. 1 is a schematic illustration of an apparatus for forming and filling a container from a preform according to exemplary embodiments of the present disclosure.

Referring initially to FIG. 1, an apparatus 10 for forming and filling a container 12 is schematically illustrated. As shown, the container 12 can be formed from a preform 14 (i.e., a parison) in some embodiments.

The container 12 can be a bottle, a jar, or any other suitable type of container, and the container 12 can be made from any suitable polymeric material, such as polyethylene terephthalate (PET). Also, the preform 14 and the container 12 can have any suitable shape, dimensions, and internal volume without departing from the scope of the present disclosure. Furthermore, although FIG. 1 illustrates the apparatus 10 as forming only one container 12 from a single preform 14, it will be appreciated that the apparatus 10 can be used for forming any number of containers 12 from respective preforms 14.

As shown in FIG. 1, the preform 14 can be provided in a gaylord 16 or other suitable handling container. For instance, the preform 14 can be injection molded in a standard injection molding machine and then stored and/or transported within the gaylord 16.

Then, the preform 14 can be fed into and positioned within an oven 18 via an infeed device 20. The oven 18 can heat the preform 14, as will be discussed before the preform 14 is blow molded. Also, the infeed device 20 can be a conveyor, a movable spindle, or another type.

Next, the preform 14 can be automatically or manually disposed within a blow mold 22. The blow mold 22 can include an interior mold surface 24 therein.

Then, a fluid 26 can be introduced into the preform 14. The flow of fluid 26 can cause the preform 14 to expand toward the mold surface 24 to form the container 12. In some embodiments, the fluid 26 is a liquid commodity (e.g., water, carbonated beverage, incompressible fluid, etc.) that is ultimately sealed, stored, shipped, and marketed inside the container 12. Thus, the container 12 can be formed from the preform 14 and filled with the fluid 26 in a substantially simultaneous fashion. In additional embodiments, the fluid 26 is air or another gas that forms the container 12 but that escapes from the container 12 before the container 12 is subsequently filled and sealed.

Figure 2:
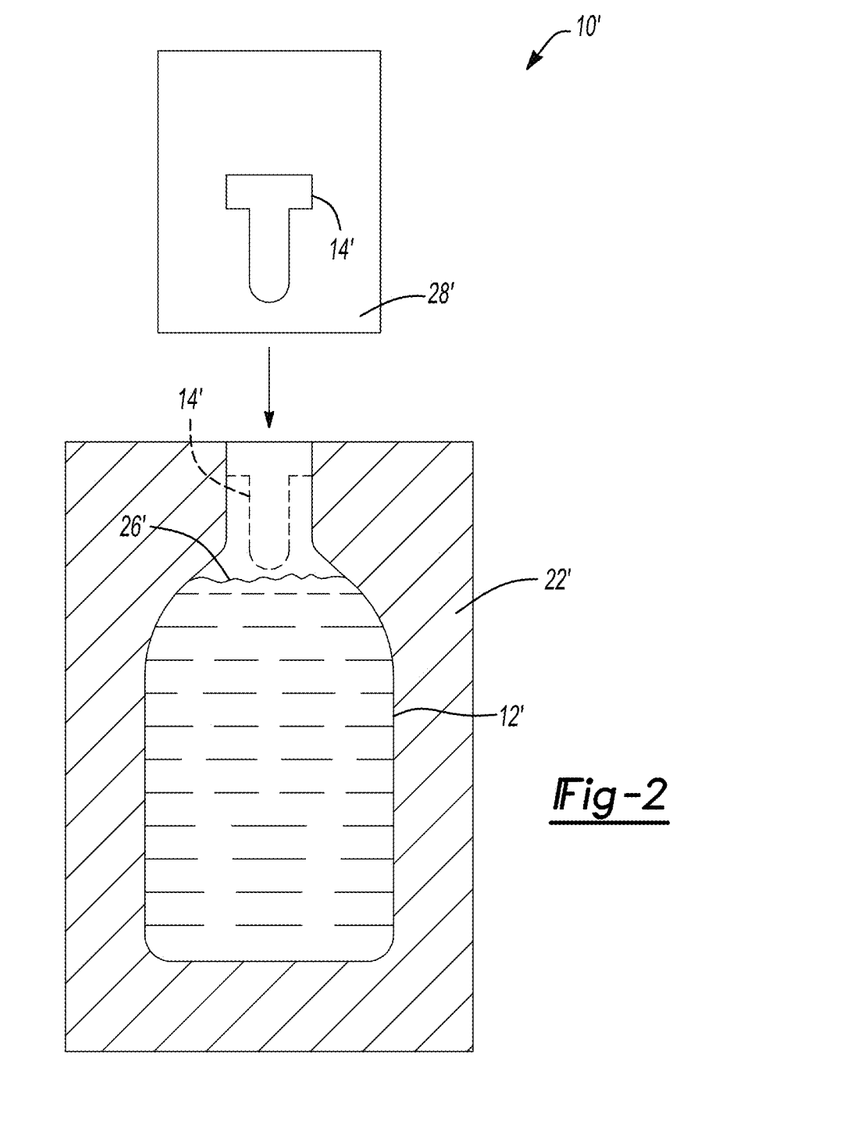
FIG. 2 is a schematic illustration of an apparatus for forming and filling the container from the preform according to additional exemplary embodiments of the present disclosure.

In additional embodiments shown in FIG. 2, the apparatus 10' can include an injection molding apparatus 28' that is used to form the preform 14' via injection molding. Then, the preform 14' can be disposed within the blow mold 22'. Next, the fluid 26' can be introduced into the preform 14' to form the container 12' as explained above.

It will be appreciated that the embodiments illustrated in FIGS. 1 and 2 can share many of the same features, and the containers 12, 12' can be formed and filled in similar ways. For purposes of simplicity, the following discussion will primarily refer back to the embodiments of FIG. 1 except as specifically noted below. However, it will be appreciated that the following discussion can apply to both the embodiments of FIG. 1 and FIG. 2.

Figure 3A:
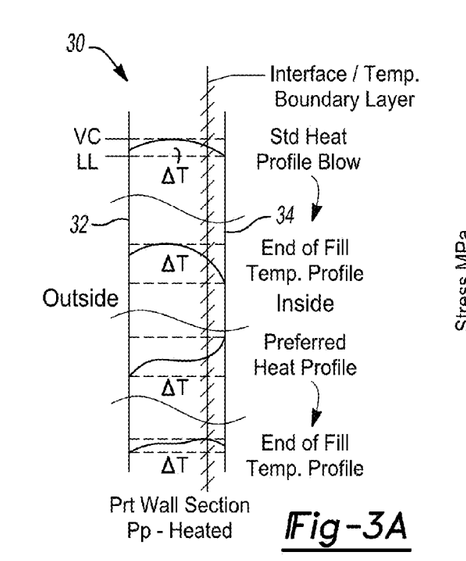
FIG. 3A is a graphical representation of the temperature gradient through a wall of a container, wherein the top graph represents a prior art container preform wall before being blow molded and filled, wherein the second graph from the top represents the prior art container preform wall after being filled, wherein the third graph from the top represents a preform container wall according to the present teachings before being blow molded and filled, and wherein the bottom graph represents the preform container wall of the present teachings after being filled.
Figure 3B:
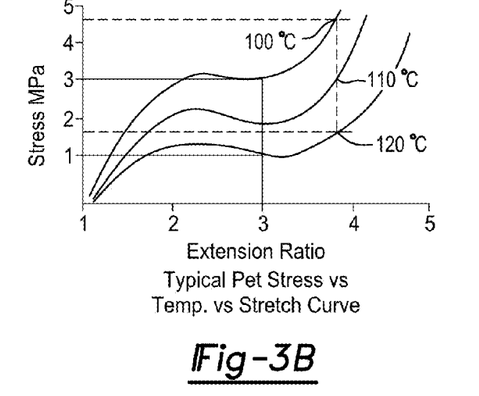
FIG. 3B is a graph representing typical stress versus stretch curves for PET at various temperatures.
Figure 3C:
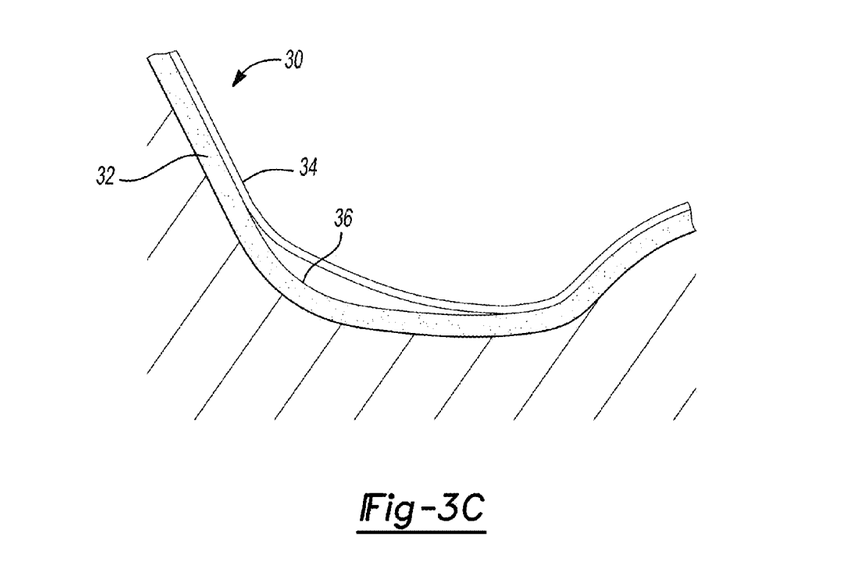
FIG. 3C is a cross sectional view of a wall of a container of the prior art.

As shown in FIGS. 3A and 3C, the preform 14 (and, thus, the container 12) can include a wall 30 with an exterior region 32 and an interior region 34. The interior region 34 can define the interior volume of the preform 14 and container 12. The exterior region 32 can be opposite the interior region 34. The interior region 34 can have an interior temperature, and the exterior region 32 can have an exterior temperature.

As will be discussed in greater detail, the apparatus 10 can be used to control the interior temperature to be within a predetermined range of the exterior temperature. This can reduce the likelihood of the interior region 34 delaminating from the exterior region 32. More specifically, as shown in the top graph of FIG. 3A representing the prior art, once a preform exits the oven and is ready to be filled to form the container, the interior and exterior temperatures can be substantially equal. However, during filling, the interior temperature can decrease at a significantly faster rate than the exterior temperature. This can cause a delamination 36 to form as shown in FIG. 3C.

It should be noted that wall 30 can comprise a monolithic structure or can comprise a multi-layer structure. It should be understood that although the present disclosure employs the terms exterior region 32 and interior region 34 in connection with wall 30, each of these regions can represent merely a general portion or section of a monolithic wall structure or each of these regions can represent separate distinct layers in a multi-layer wall structure. Therefore, it is important to recognize that the discussion, drawings, and claims of the present application are not to be limited to any particular wall structure unless otherwise noted and thus the use of the term region in the specification or a demarcation line in the drawings are used in a positionally-relative context rather than a distinct-layer context.

The above technical challenge results from the fact that liquids, such as water and juice, are denser than air and therefore act as a much greater heat sink than air at a given temperature. Additionally, liquid filling temperatures have traditionally been much lower (as low as 10 degrees C.) than that of traditional air in blow molding applications which is generally ambient. Therefore, it has been determined that the following relationship is generally required to fulfill both technical and commercial considerations: the Internal Preform Temperature is greater than the External Preform Temperature which is greater than the Liquid Temperature.

However, the present teachings can be employed for controlling the interior temperature such that delaminations 36 are unlikely to form. For instance, in some embodiments of the present teachings (represented in the graph third from the top in FIG. 3A), the interior temperature of the preform 14 can be significantly greater than the exterior temperature. Then, once the container 12 is formed and filled with the liquid, the interior temperature will not fall significantly below the outer temperature which may result in variation of stretching characteristics. As such, the interior region 34 is less likely to delaminate from the exterior region 32.

Figure 4:
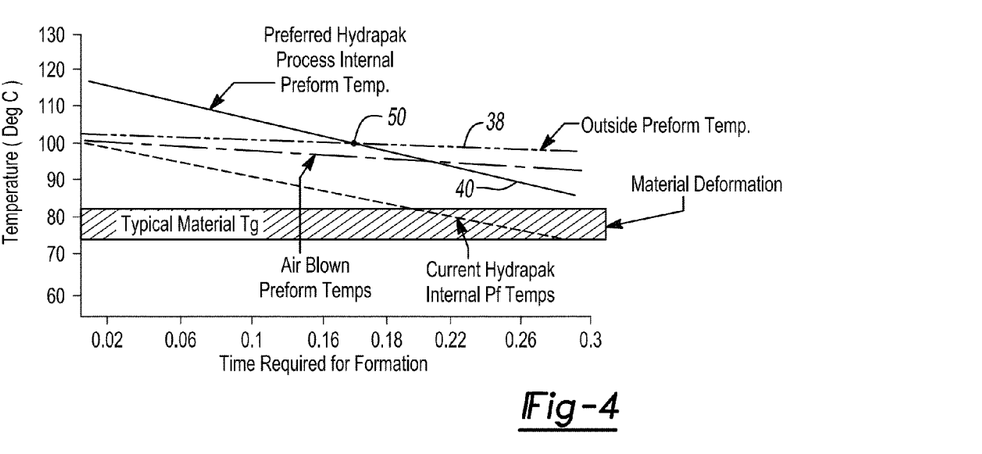
FIG. 4 is a graph showing temperature versus filling time for the exterior and interior regions of the container wall.
Figure 5:
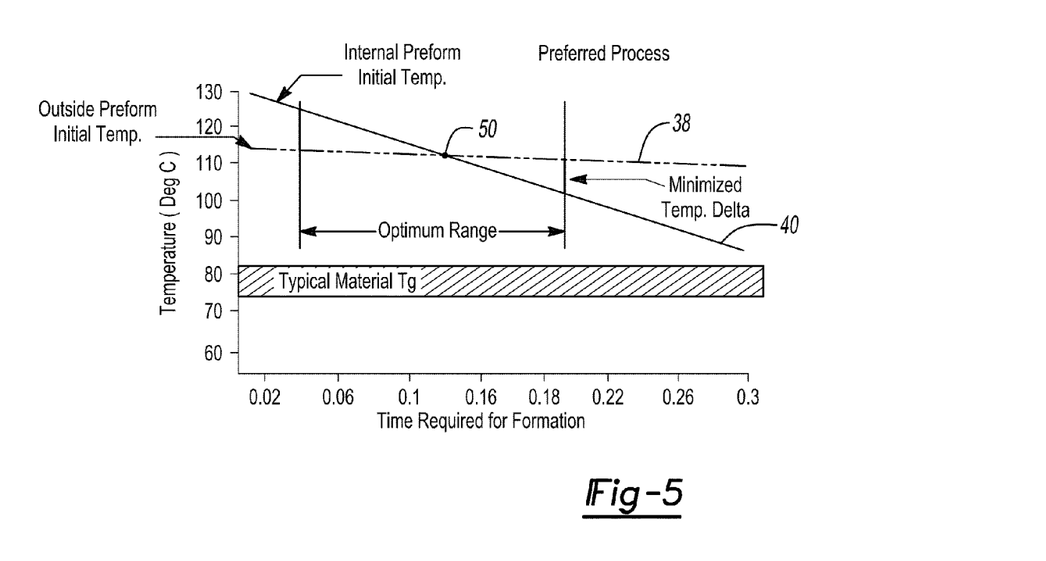
FIG. 5 is a graph showing temperature versus filling time for the exterior and interior regions of the container wall according to additional embodiments.
Figure 6:
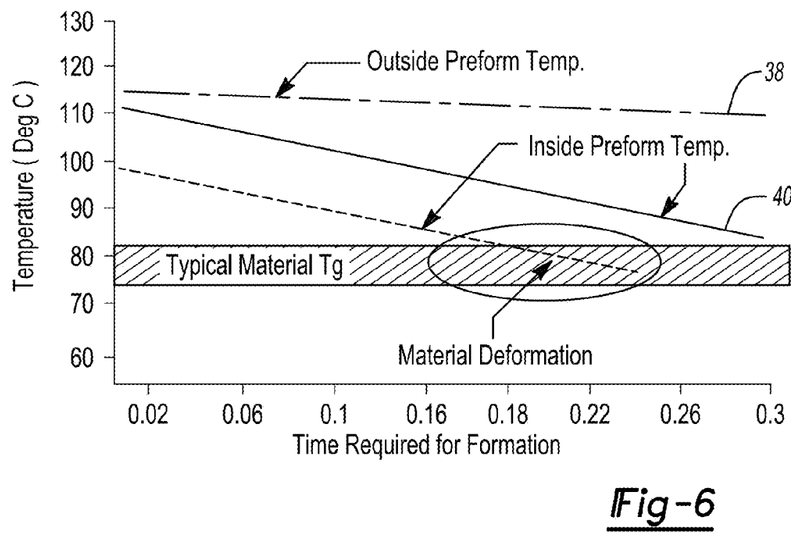
FIG. 6 is a graph showing temperature versus filling time for the exterior and interior regions of the container wall according to additional embodiments.

More specifically, FIGS. 4, 5, and 6 illustrate the change in exterior temperature (represented by line 38) and the change in interior temperature (represented by line 40) while the container 12 is formed and filled with the fluid 26. (In the embodiments shown, it can take approximately 0.50 seconds or less to fill the container 12 with the fluid 26, and additional cooling of the container 12 occurs after filling.) As shown in the embodiments of FIGS. 4 and 5, the interior temperature can be initially greater than the exterior temperature, but the interior temperature can rapidly reduce, and by the time filling is completed, the interior temperature can be less than the exterior temperature. In the embodiments of FIG. 6, the interior temperature is below the exterior temperature initially and gradually reduces during filling. However, in all embodiments, it is preferred that for as long as possible during the forming process that the interior temperature remains above the glass transition temperature Tg of PET or other materials used for forming the preform 14. Therefore, delaminations 36 are unlikely to form.

Also, the change in temperature gradient between the interior and exterior temperatures during filling can be controlled. For instance, in the embodiments of FIGS. 4 and 5, a predetermined amount of the fluid 26 can be introduced into the container 12 before the internal temperature drops below the exterior temperature (i.e., point 50 in FIGS. 4 and 5). For instance, in some embodiments, at least approximately 10% of the final amount of the fluid 26 can be introduced before the internal temperature drops below the exterior temperature. Also, in some embodiments, at least approximately 25% of the final amount of the fluid 26 can be introduced before the internal temperature drops below the exterior temperature and more preferably at least 50% to 100%. Otherwise, in the embodiments of FIG. 6, the interior temperature can be below the exterior temperature even before filling with the fluid 26, and yet the interior temperature does not drop below the glass transition temperature Tg. In still other embodiments, the interior temperature can remain at or above the exterior temperature during filling and thereafter. Therefore, for any chosen polymer material, the preferred working range for preform temperature is from about the glass transition temperature Tg of the material to about 90 degrees (Celsius) above the glass transition temperature Tg of the material.

In some embodiments, the interior and exterior temperatures can remain between approximately 105 and 140 degrees Celsius when the preform 14 exits the oven 18 and/or once the container 12 filling forming process is initiated. Also, in some embodiments, the interior temperature can be zero to twenty degrees Celsius greater than the exterior temperature after the preform 14 exits the oven 18 and/or once the container 12 is filled. Also, in some embodiments, the interior temperature can be five to ten degrees Celsius greater than the exterior temperature after the preform 14 exits the oven 18 and/or once the preform 14 is placed into the blow mold. It will be appreciated, however, that the interior temperature can begin at, or fall below, the exterior temperature in some embodiments, and yet the temperature gradient can be within a predetermined range so that delaminations 36 are unlikely to form. By creating the desired preform temperature gradient prior to liquid injection it is then possible to ensure that at least 10% of the predetermined volume of liquid is introduced into the preform prior to the internal preform temperature dropping below the preform external temperature, preferably at least 25%, and more preferably at least 50% to 100%. It is further desired that at least 80% of the predetermined volume of liquid is introduced into the preform prior to the preform internal temperature dropping below the material glass transition temperature Tg, preferably at least 90%, and more preferably 100%.

Also, delaminations 36 can be reduced by controlling the temperature of the fluid 26 to be with a predetermined range as the fluid 26 expands the preform 14 and the container 12 is formed. In some embodiments, the temperature range of the fluid 26 can be between 0 and 100 degrees Celsius. If the temperature of the fluid 26 is closer to the interior temperature of the preform, heat transfer from the interior region 34 to the fluid 26 is less pronounced. Therefore, the preform may be heated so that the interior temperature can be closer to the exterior temperature (FIG. 3A, bottom graph), and delaminations 36 are less likely to form.

Figure 7:
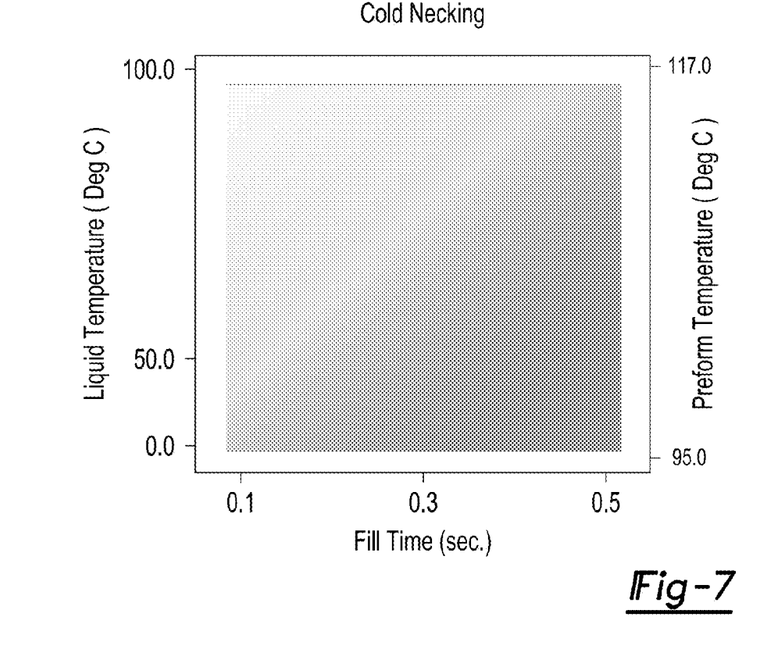
FIG. 7 is graph showing the cold necking behavior of PET material.

Furthermore, FIG. 7 graphically illustrates the relationship between the temperature of the fluid 26 and the fill rate/time of the container 12. As shown, a higher temperature fluid 26 can be used to fill the container 12 at a lower fill rate, and vice versa. Thus, delaminations 36 can be reduced during formation of the container 12 by relying on data of the type shown in FIG. 7 and choosing an appropriate fill rate and temperature of the fluid 26.

It will also be appreciated that certain regions of the container 12 may be prone to the formation of delaminations 36. For instance, areas of the container 12 (e.g., the foot of the container 12) that are stretched more and/or stretched after other areas of the container 12 may be more prone to delaminations 36. Thus, the design of the mold surfaces 24 of the blow mold 22 and the fill rate of the fluid 26 can also be designed to reduce delaminations 36 in these areas of the container 12.

Various embodiments for controlling the interior temperature of the preform 14 relative to the exterior temperature will now be discussed. For instance, the preform 14 can be heated before the preform 14 enters the oven 18. Specifically, heated air can be blown into the preform 14 before being placed and additionally heated in the oven 18. Also, a heating element (e.g., a resistive heater) can be operably coupled to the infeed device 20 to preheat the preform 14 before being placed in the oven 18. Moreover, the gaylord 16 can be heated to preheat the preform 14 therein before the preform 14 is removed and fed into the oven 18. In each of these embodiments, the interior temperature of the preform 14 can be highly controlled to be within the predetermined range of the exterior temperature 14, and delaminations 36 are less likely to form.

Also, in the embodiments illustrated in FIG. 2, the preform 14' can be formed inside the injection molding apparatus 28', and the preform 14' can be removed before cooling significantly. Soon after, while the preform 14' still has residual heat from the injection molding process, the preform 14' can be blow molded with the within the blow mold 22' to form the container 12'. As such, the preform 14' can be at an elevated temperature with the interior and exterior temperatures at the predetermined temperature gradient, and the container 12' can be formed therefrom.

Referring back to the apparatus 10 of FIG. 1, the preform 14 can also be heated to a predetermined temperature via X-ray, microwave, and/or near infrared (NIR) beam technology before being blow molded within the blow mold 22. The X-ray, microwave, or NIR beam can be focused on the interior region 34 to focus heat thereon.

Still further, the preform 14 can be heated in a predetermined manner inside the oven 18 such that the interior temperature is within the predetermined range of the exterior temperature. For instance, in some embodiments, heat can be focused on the interior region 34 of the preform by directing hot air onto the interior region 34. More specifically, a spindle (not particularly shown) can be received in the preform 14 to support the preform 14 within the oven 18, and hot air can be directed through the spindle to be delivered to the interior region 34 of the preform 14. The hot air can be supplied from an external source and/or the hot air can be circulated from within the oven 18 and through the spindle to the interior region 34. Also, in some embodiments, a heating element (e.g., a resistive heating element) can be operably coupled to the spindle to thereby heat the interior region 34 of the preform 14.

In still additional embodiments, a heat sink (such as air ventilation) can be operably coupled to the exterior region 32 of the preform 14 while in the oven 18 such that the exterior temperature of the preform 14 is reduced while in the oven 18. As such, the temperature gradient between the interior region 34 and the exterior region 32 can be controlled.

In still additional embodiments, the interior region 34 can be initially formed to include a predetermined surface texture with a predetermined surface roughness for controlling the interior temperature during formation and/or filling of the container 12. For instance, the surface texture can affect heat transfer to the fluid 26 in a predetermined manner such that the interior temperature remains within the predetermined range of the exterior temperature to reduce the formation of delaminations 36. Likewise, in some embodiments, a surface coating can be applied to the interior region 34 to affect heat transfer and to reduce the formation of delaminations 36. Additionally, the material used to form the preform 14 can be specifically chosen to have a particular density that controls heat transfer to keep the interior temperature within the predetermined range of the exterior temperature.

Thus, delaminations 36 of the interior region 34 from the exterior region 32 can be reduced during formation and filling of the container 12. The temperature gradient between the interior region 34 and exterior region 32 can be controlled in a variety of ways. Also, the temperature and filling rate of the fluid 26 used for filling the container 12 can be controlled for reducing delaminations 36. It will be appreciated that these and other variables can be controlled according to the particular material used to form the preform 14, the dimensions of the preform 14 and/or container 12, the type of fluid 26 that fills the container 12, etc. Thus, because the container 12 is less likely to include delaminations 36, the appearance of the container 12 can be improved; the structural strength and rigidity of the container 12 can be improved, etc.

According to some embodiments, the teachings of the present disclosure provide a method of forming a container that is operable to hold a substance, wherein the container is made from a polymeric material. The method includes providing a preform of the container, the preform having a wall with an interior region and an exterior region; disposing the preform in a mold cavity, the mold cavity having a mold surface; introducing the substance into the preform to expand the preform toward the mold surface, the substance having a substance temperature, the interior region of the wall having a first interior temperature prior to the introduction of the substance and a second interior temperature after the introduction of the substance, the exterior region of the wall having a first exterior temperature prior to the introduction of the substance and a second exterior temperature after the introduction of the substance; and controlling the first interior temperature to be greater than the first exterior temperature prior to the introduction of the substance.

In some embodiments, the first interior temperature and the first exterior temperature are each within the range of about the glass transition temperature Tg of the polymeric material to about the glass transition temperature Tg of the polymeric material plus 90 degrees Celsius.

In some embodiments, controlling the first interior temperature includes controlling the first interior temperature to be between approximately five to twenty degrees Celsius greater than the first exterior temperature. In some embodiments, controlling the first interior temperature includes controlling the first interior temperature to be between approximately ten to twenty degrees Celsius greater than the first exterior temperature.

In some embodiments, controlling the first interior temperature to be greater than the first exterior temperature includes controlling the first interior temperature to be greater than the first exterior temperature and the first exterior temperature to be greater than a temperature of the substance.

In some embodiments, the polymeric material is polyethylene terephthalate (PET) and the first interior temperature is in the range of about 115 degrees Celsius to about 140 degrees Celsius and the first exterior temperature is in the range of about 105 degrees Celsius to about 130 degrees Celsius. In some embodiments, the substance is a liquid having a temperature in the range of zero to 100 degrees Celsius.

In some embodiments, the polymeric material is polyethylene terephthalate (PET) and wherein controlling the first interior temperature includes controlling the first interior temperature to be between approximately five to twenty degrees Celsius greater than the first exterior temperature. In some embodiments, controlling the first interior temperature includes controlling the first interior temperature to be between approximately ten to twenty degrees Celsius greater than the first exterior temperature.

In some embodiments, introducing the substance includes introducing a substantially incompressible fluid into the preform. In some embodiments, introducing a substantially incompressible fluid into the preform includes introducing a predetermined volume of the substantially incompressible fluid into the preform, wherein at least 10% of the predetermined volume of fluid is introduced prior to the second interior temperature being less than the second exterior temperature. In some embodiments, introducing a substantially incompressible fluid into the preform includes introducing a predetermined volume of the substantially incompressible fluid into the preform, wherein at least 25% of the predetermined volume of fluid is introduced prior to the second interior temperature being less than the second exterior temperature.

In some embodiments, introducing a substantially incompressible fluid into the preform includes introducing a predetermined volume of the substantially incompressible fluid into the preform, wherein at least 50% of the predetermined volume of fluid is introduced prior to the second interior temperature being less than the second exterior temperature. In some embodiments, the predetermined volume of the substantially incompressible fluid is equal to the volume of the substantially incompressible fluid that will be sealed and stored within the container.

In some embodiments, introducing a substantially incompressible fluid into the preform includes introducing a predetermined volume of the substantially incompressible fluid into the preform, wherein at least 80% of the predetermined volume of fluid is introduced prior to the second interior temperature being less than the glass transition temperature of the polymeric material. In some embodiments, at least 90% of the predetermined volume of fluid is introduced prior to the second interior temperature being less than the glass transition temperature of the polymeric material. In some embodiments, at least 100% of the predetermined volume of fluid is introduced prior to the second interior temperature being less than the glass transition temperature of the polymeric material.

In some embodiments, the method can comprise heating the preform in an oven before disposing the preform in the mold cavity, and wherein controlling the first interior temperature includes introducing a quantity of heated air into the preform before heating the preform in the oven.

In some embodiments, the method can comprise heating the preform in an oven before disposing the preform in the mold cavity, wherein controlling the first interior temperature includes preheating the preform with a heating element that is coupled to an infeed device that feeds the preform into the oven.

In some embodiments, the method can comprise injection molding the preform to produce the preform at an elevated temperature, and wherein controlling the first interior temperature includes transferring the preform substantially at the elevated temperature to the mold cavity for subsequent introduction of the substance into the preform.

In some embodiments, the method can comprise transporting the preform in a gaylord, and wherein controlling the first interior temperature includes heating the preform within the gaylord.

In some embodiments, controlling the first interior temperature includes heating the interior region by applying at least one of an X-ray, a microwave, and a near infrared beam to the interior region.

In some embodiments, the method can comprise disposing the preform in an oven before disposing the preform in the mold cavity, and focusing heat on the interior region while the preform is in the oven. In some embodiments, focusing heat on the interior region includes directing hot air onto the interior region. In some embodiments, the hot air is provided by circulating the hot air from within the oven. In some embodiments, the hot air is provided by providing the hot air from outside the oven.

In some embodiments, the method can comprise supporting the preform on a spindle inside the oven, and wherein focusing heat on the interior region includes heating the spindle to heat the interior region.

In some embodiments, the method can comprise heating the preform in an oven before disposing the preform in the mold cavity, and wherein controlling the interior temperature includes cooling the exterior region while in the oven.

In some embodiments, controlling the interior temperature includes controlling the substance temperature to be within a predetermined substance temperature range, wherein heat transfers between the interior region and the substance to keep the second interior temperature within a predetermined range of the second exterior temperature. In some embodiments, the predetermined substance temperature range is between approximately 32 and 210 degrees Fahrenheit.

In some embodiments, the method can comprise controlling an expansion rate for expanding the preform toward the mold surface to within a predetermined rate.

In some embodiments, providing the preform includes providing the preform to have an interior region with a predetermined surface texture that allows heat transfer sufficient for keeping the first interior temperature greater than the first exterior temperature prior to the introduction of the substance.

In some embodiments, providing the preform includes providing a coating on the interior region that allows heat transfer sufficient for keeping the first interior temperature greater than the first exterior temperature prior to the introduction of the substance.

In some embodiments, providing the preform includes providing the preform to have a density that allows heat transfer sufficient for keeping first interior temperature greater than the first exterior temperature prior to the introduction of the substance.

According to some embodiments, the teachings of the present disclosure provide a method of forming a container that is operable to hold a substance, wherein the container is made from a polymeric material. The method can include providing a preform of the container, the preform having a wall with an interior region and an exterior region; disposing the preform of the container in a mold cavity, the mold cavity having a mold surface; introducing the substance into the preform to expand the preform toward the mold surface, the substance having a substance temperature, the interior region of the wall having a first interior temperature prior to the introduction of the substance and a second interior temperature after the introduction of the substance, the exterior region of the wall having a first exterior temperature prior to the introduction of the substance and a second exterior temperature after the introduction of the substance; and controlling at least one of heat transfer away from the interior region, a fill rate of the substance into the preform, and a substance temperature of the substance to maintain the first interior temperature greater than the first exterior temperature prior to the introduction of the substance.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of forming a container that is operable to hold a liquid substance, the container made from a polymeric material, the method comprising:
   providing a preform of the container, the preform being heated and having a wall with an interior region and an exterior region;
   disposing the preform in a mold cavity having a mold surface;
   while in the mold cavity, the interior region of the preform being at a first interior temperature and the exterior region of the preform being at a first exterior temperature, the first interior temperature being greater than the first exterior temperature;
   introducing the liquid substance into the preform at a substance temperature to expand the preform toward the mold surface while the interior region of the preform is at the first interior temperature and the exterior region of the preform is at the first exterior temperature, the substance temperature being less than the first exterior temperature; and
   completing the introducing of the liquid substance, wherein after completing the introducing of the liquid substance the interior region of the wall is at a second interior temperature and the exterior region of the wall is at a second exterior temperature, the second interior temperature being not significantly less than the second exterior temperature.

2. The method of claim 1, wherein the first interior temperature and the first exterior temperature are each within the range of about the glass transition temperature Tg of the polymeric material to about the glass transition temperature Tg of the polymeric material plus 90 degrees Celsius.

3. The method of claim 1, wherein the first interior temperature is controlled to be between approximately five to twenty degrees Celsius greater than the first exterior temperature.

4. The method of claim 3, wherein the first interior temperature is controlled to be between approximately ten to twenty degrees Celsius greater than the first exterior temperature.

5. The method of claim 1, wherein the polymeric material is polyethylene terephthalate (PET) and the first interior temperature is in the range of about 115 degrees Celsius to about 140 degrees Celsius and the first exterior temperature is in the range of about 105 degrees Celsius to about 130 degrees Celsius.

6. The method of claim 5, wherein the substance temperature is in the range of zero to 100 degrees Celsius.

7. The method of claim 1, wherein the polymeric material is polyethylene terephthalate (PET) and wherein the first interior temperature is controlled to be between approximately five to twenty degrees Celsius greater than the first exterior temperature.

8. The method of claim 7, wherein the first interior temperature is controlled to be between approximately ten to twenty degrees Celsius greater than the first exterior temperature.

9. The method of claim 1, wherein introducing the liquid substance includes introducing a substantially incompressible fluid into the preform.

10. The method of claim 9 wherein introducing a substantially incompressible fluid into the preform includes introducing a predetermined volume of the substantially incompressible fluid into the preform, wherein at least 10% of the predetermined volume of fluid is introduced into the preform prior to the second interior temperature being less than the second exterior temperature.

11. The method of claim 9 wherein introducing a substantially incompressible fluid into the preform includes introducing a predetermined volume of the substantially incompressible fluid into the preform, wherein at least 25% of the predetermined volume of fluid is introduced into the preform prior to the second interior temperature being less than the second exterior temperature.

12. The method of claim 9 wherein introducing a substantially incompressible fluid into the preform includes introducing a predetermined volume of the substantially incompressible fluid into the preform, wherein at least 50% of the predetermined volume of fluid is introduced into the preform prior to the second interior temperature being less than the second exterior temperature.

13. The method of claim 12 wherein the predetermined volume of the substantially incompressible fluid is equal to a volume of the substantially incompressible fluid that will be sealed and stored within the container.

14. The method of claim 9 wherein introducing a substantially incompressible fluid into the preform includes introducing a predetermined volume of the substantially incompressible fluid into the preform, wherein at least 80% of the predetermined volume of fluid is introduced into the preform prior to the second interior temperature being less than the glass transition temperature of the polymeric material.

15. The method of claim 14 wherein at least 90% of the predetermined volume of fluid is introduced into the preform prior to the second interior temperature being less than the glass transition temperature of the polymeric material.

16. The method of claim 14 wherein 100% of the predetermined volume of fluid is introduced into the preform prior to the second interior temperature being less than the glass transition temperature of the polymeric material.

17. The method of claim 1, further comprising heating the preform in an oven before disposing the preform in the mold cavity, and wherein the first interior temperature is controlled by introducing a quantity of heated air into the preform before heating the preform in the oven.

18. The method of claim 1, further comprising heating the preform in an oven before disposing the preform in the mold cavity, wherein the first interior temperature is controlled by preheating the interior region of the preform with a heating element that is coupled to an infeed device that feeds the preform into the oven.

19. the method of claim 1, wherein the providing of the preform includes injection molding the preform to produce the preform at an elevated temperature, and wherein the first interior temperature is controlled by transferring the preform substantially at the elevated temperature to the mold cavity for subsequent introduction of the liquid substance into the preform.

20. The method of claim 1, further comprising transporting the preform in a gaylord, and wherein the first interior temperature is controlled by heating the preform within the gaylord.

21. The method of claim 1, wherein the first interior temperature is controlled by heating the interior region by applying at least one of an X-ray, a microwave, and a near infrared beam to the interior region.

22. The method of claim 1, further comprising disposing the preform in an oven before disposing the preform in the mold cavity, and focusing heat on the interior region while the preform is in the oven.

23. The method of claim 22, wherein focusing heat on the interior region includes directing hot air onto the interior region.

24. The method of claim 23, wherein the hot air is provided by circulating the hot air from within the oven.

25. The method of claim 23, wherein the hot air is provided by providing the hot air from outside the oven.

26. The method of claim 22, further comprising supporting the preform on a spindle inside the oven, and wherein focusing heat on the interior region includes heating the spindle to heat the interior region.

27. The method of claim 1, further comprising heating the preform in an oven before disposing the preform in the mold cavity, and wherein the interior temperature is controlled by cooling the exterior region while in the oven.

28. The method of claim 1, wherein the interior temperature is controlled by controlling the substance temperature to be within a predetermined substance temperature range, wherein heat transfers between the interior region and the liquid substance to keep the second interior temperature within a predetermined range of the second exterior temperature.

29. The method of claim 28, wherein the predetermined substance temperature range is between approximately 32 and 210 degrees Fahrenheit.

30. The method of claim 1, further comprising controlling an expansion rate for expanding the preform toward the mold surface to within a predetermined rate.

31. The method of claim 1, wherein providing the preform includes providing the preform to have an interior region with a predetermined surface texture that allows heat transfer sufficient for keeping the first interior temperature greater than the first exterior temperature prior to the introduction of the liquid substance.

32. The method of claim 1, wherein providing the preform includes providing a coating on the interior region that allows heat transfer sufficient for keeping the first interior temperature greater than the first exterior temperature prior to the introduction of the liquid substance.

33. The method of claim 1, wherein providing the preform includes providing the preform to have a density that allows heat transfer sufficient for keeping first interior temperature greater than the first exterior temperature prior to the introduction of the liquid substance.

34. The method according to claim 1, wherein a time for forming the container is between 0.04 seconds and 0.20 seconds.

35. The method according to claim 1 wherein the first interior temperature is approximately 130° C. and the first exterior temperature is approximately 115° C.

36. The method according to claim 1, wherein the time for forming the container is between 0.04 seconds and 0.13 seconds.

37. The method according to claim 1, wherein an extension ratio of the preform in at least one direction of extension is greater than 3.

38. The method according to claim 1, wherein upon the completing of the introducing of the liquid substance, the second interior temperature is greater than the glass transition temperature of the polymeric material.

39. The method according to claim 1, wherein a first differential between the first interior temperature and the first exterior temperature is greater than a second differential between the second interior temperature and the second exterior temperature.

40. The method according to claim 1, wherein upon the completing of the introducing of the liquid substance, the second interior temperature is not significantly less than the second exterior temperature whereby delamination of the interior region from the exterior region is prevented.

41. The method according to claim 1, wherein upon the completing of the introducing of the liquid substance, the second interior temperature is less than the second exterior temperature.

42. A method of forming a container that is operable to hold a liquid substance, the container made from a polymeric material, the method comprising:
  providing a preform of the container, the preform being heated and having a wall with an interior region and an exterior region;
  disposing the preform of the container in a mold cavity, the mold cavity having a mold surface;
  while in the mold cavity, the interior region of the preform being at a first interior temperature and the exterior region of the heated preform being at a first exterior temperature, the first interior temperature being greater than the first exterior temperature;
  introducing the liquid substance into the preform at a substance temperature to expand the preform toward the mold surface while the interior region of the preform is at the first interior temperature and the exterior region of the preform is at the first exterior temperature; and
  maintaining the first interior temperature greater than the first exterior temperature prior to the introduction of the substance by controlling at least one of heat transfer away from the interior region, a fill rate of the liquid substance into the preform, and a substance temperature of the liquid substance; and
  completing the introducing of the liquid substance, wherein after completing the introducing of the liquid substance the interior region of the wall is at a second interior temperature and the exterior region of the wall is at a second exterior temperature, the second interior temperature being not significantly less than the second exterior temperature.

* * * * *